United States Patent
Field

(10) Patent No.: US 7,419,077 B2
(45) Date of Patent: Sep. 2, 2008

(54) FILM TRANSPORT

(76) Inventor: Roger Constantine Field, P.O. Box 950169, 81517 Munich (DE)

( * ) Notice: Subject to any disclaimer, the term of this patent is extended or adjusted under 35 U.S.C. 154(b) by 1370 days.

(21) Appl. No.: 09/981,816

(22) Filed: Oct. 19, 2001

(65) Prior Publication Data

US 2006/0138191 A1 Jun. 29, 2006

(51) Int. Cl.
*B65H 20/00* (2006.01)
(52) U.S. Cl. .................. 226/128; 226/126; 226/160; 226/53
(58) Field of Classification Search ................ 226/128, 226/123, 124, 158, 160, 167, 53, 126
See application file for complete search history.

(56) References Cited

U.S. PATENT DOCUMENTS

| | | | | |
|---|---|---|---|---|
| 4,198,136 A | * | 4/1980 | Staudacher et al. | 352/169 |
| 5,534,954 A | * | 7/1996 | Vetter | 352/79 |
| 5,667,122 A | * | 9/1997 | Young et al. | 226/20 |
| 5,923,402 A | * | 7/1999 | Yee et al. | 352/184 |
| 6,037,973 A | * | 3/2000 | DiGiulio et al. | 348/96 |
| 6,478,426 B1 | * | 11/2002 | Druzynski et al. | 352/166 |
| 2006/0138191 A1 | * | 6/2006 | Field | 226/53 |

* cited by examiner

*Primary Examiner*—Evan H Langdon

(57) ABSTRACT

A device for transporting film (5), in particular unperforated film (5) without slippage, in particular intermittently, powered by at least one electric motor (8), having at least one element such as a needle point (2) mechanically engage film (5) by entering it and transporting film (5) from a start position to a stop position. An element such as a pressure plate (7) may be used in one embodiment to hold the film steady during exposure and a movable element (7) may act on the film to hold it during exposure. At least one mark may be exposed on film (5) to aid in picture registration. At least one roller (31) controls the length of loops of film (5) before and after the aperture. The roller (31) may transport the film (5) by friction, or, in another embodiment the roller (31) may have radially mounted needles (2) which penetrate film (5) to hold film (5) while transporting it. Provision may be made to protect the device in the event of a jam of polyester-base film (5) which is difficult to tear, by causing unit (12) holding needle (2) or needles (2) transporting film (5) to swivel, in one embodiment, to disengage needle (2) or needles (2) from film (5) and automatically switch off electric motor (8).

8 Claims, 1 Drawing Sheet

FILM TRANSPORT

BACKGROUND OF THE INVENTION

1. Field of the Invention

The invention is a device for transporting film, in particular intermittently, in particular photographic film for motion pictures, in particular unperforated film.

2. Description of the Prior Art

It is known that film which is transported with conventional mechanisms is provided with perforations. A pulldown claw is used to transport film intermittently in a motion picture camera. Unperforated film cannot be transported for motion picture use by conventional transport devices, since there are no perforations for eg. a pulldown claw which is normally used to transport the film intermittently.

It is possible to transport film such as unperforated film using friction on the film surface. It is not possible to transport film accurately intermittently at high speeds using friction alone on the film surface. It is desirable to transport unperforated film because the perforations on the film limit the width of the exposed pictures (frames). Perforating film is expensive because of the close tolerances required between perforations, and microscopic dust caused by the perforating process must be removed during manufacture of the film. Unperforated film therefore allows a wider, larger picture, which means improved picture quality at reduced cost.

It is also known that transporting perforated polyester-based film using conventional mechanisms, eg. with a pulldown claw is possible. However, this is dangerous for the mechanism if the film jams, because polyester film is very difficult to tear.

SUMMARY OF THE INVENTION

The invention provides the solution for transporting unperforated film without slippage. Perforated film may be transported in one embodiment of the invention, and polyester film may be safely transported. The film is partly penetrated, fully penetrated or indented in various embodiments of the invention, so that it may be accurately transported. Friction against the film to move the film may, in one embodiment, additionally be used. At least one element such as a needle point enters the film for a short distance such as a few hundredths of a millimeter, in one embodiment. It is desirable to use at least two needlepoints or more outside the picture area or possibly four for high speeds for slow motion filming. The needles may be made of steel, sapphire or diamond, for example. The needles may be mounted on a pivoting unit so that the needles may pivot away from the film in case of a film jam. The pivoting unit may be held by friction or a spring-loaded device or by magnetic force, until undue resistance such as jammed film is met, or the unit may mechanically disengage. An electrical contact may be broken to turn off an electric motor driving the transport device, as this occurs. This is especially important when polyester-based film is used, because this type of film is difficult to tear. The film should preferably be transported intermittently with each frame being separately exposed by a shutter such as a rotating shutter, because continuously transported film is usually exposed via a rotating prism which is not desirable. The film may be held steady during exposure of the film to light at the picture aperture by at least one element. The element may be a spring-loaded pressure element such as a pressure plate acting on the back of the film, for example, behind the picture aperture, for example. At least one moveable element may be used in another embodiment, separately, or in conjunction with a pressure element. This moveable element may be rubber-tipped, to apply pressure to eg. the back of the film, at the correct time, so that the film is held steady during exposure. The moveable element may move horizontally or pivot around a bearing or apply pressure against eg. a plate acting against the film via an element such as an eccenter on a rotating shaft. At least one mark, eg. a circular mark may be exposed on the film eg. outside the picture area, eg. between pictures by eg. a light-emitting diode (LED), with a fixed distance from the exposed frame, to provide picture registration reference, eg. for telecine. Two marks may be exposed, if this system is used, eg. as far apart as possible between pictures, next to each other, eg. on the frameline for control of vertical and horizontal picture registration eg. for telecine. The transport device may be eg. eccentric-operated or eg. rotary with eg. radially mounted needles which may, in one embodiment, be moved in a stepping motion. The needles may enter the film at a transport start position, move the film a certain distance to an end position, eg. for a distance of 19 mm travel in one embodiment, if 35 mm film is used. The film may be transported vertically or horizontally in different embodiments, eg. in a camera. When transporting unperforated film out of the magazine which stores the film, toothed sprockets which normally engage the perforations in the film can no longer be used. The film loop lengths from the magazine to the film gate and from the film gate (picture aperture) back to the magazine must be controlled. At least one roller with eg. clamps or rollers holding the film against parts of the roller's circumference may be used to correctly transport the film to and from the magazine. This roller may be a friction roller made eg. of polyurethane or silicone rubber or it may pierce (penetrate) or partially pierce the film or indent the film to have a proper hold on the film. Several needles may be radially mounted in tight-fitting holes in the roller, so that eg. very short needle points project radially from the roller, or a friction roller or rollers may be used, or a combination of both. The transport device may pierce the film on one side of the film and the magazine roller or rollers may pierce the film on the other side of the film. The loop length may be monitored eg mechanically or eg. by infra red light which controls eg. the speed of one or more electric motors on the magazine or connected to the roller or rollers or both. If points are used, they may be offset from needles in the transport device so that piercings in the film from the roller do not correspond to where needles in the transport device enter the film. Provision may be made to absorb or divert any film particles caused by entry of the needlepoints into the film, away, eg. sideways, away from the picture area, away from the film.

BRIEF DESCRIPTION OF THE DRAWING

A preferred embodiment of the invention is described in the following description and the drawing.

DESCRIPTION OF THE PREFERRED EMBODIMENT

Figure 1:
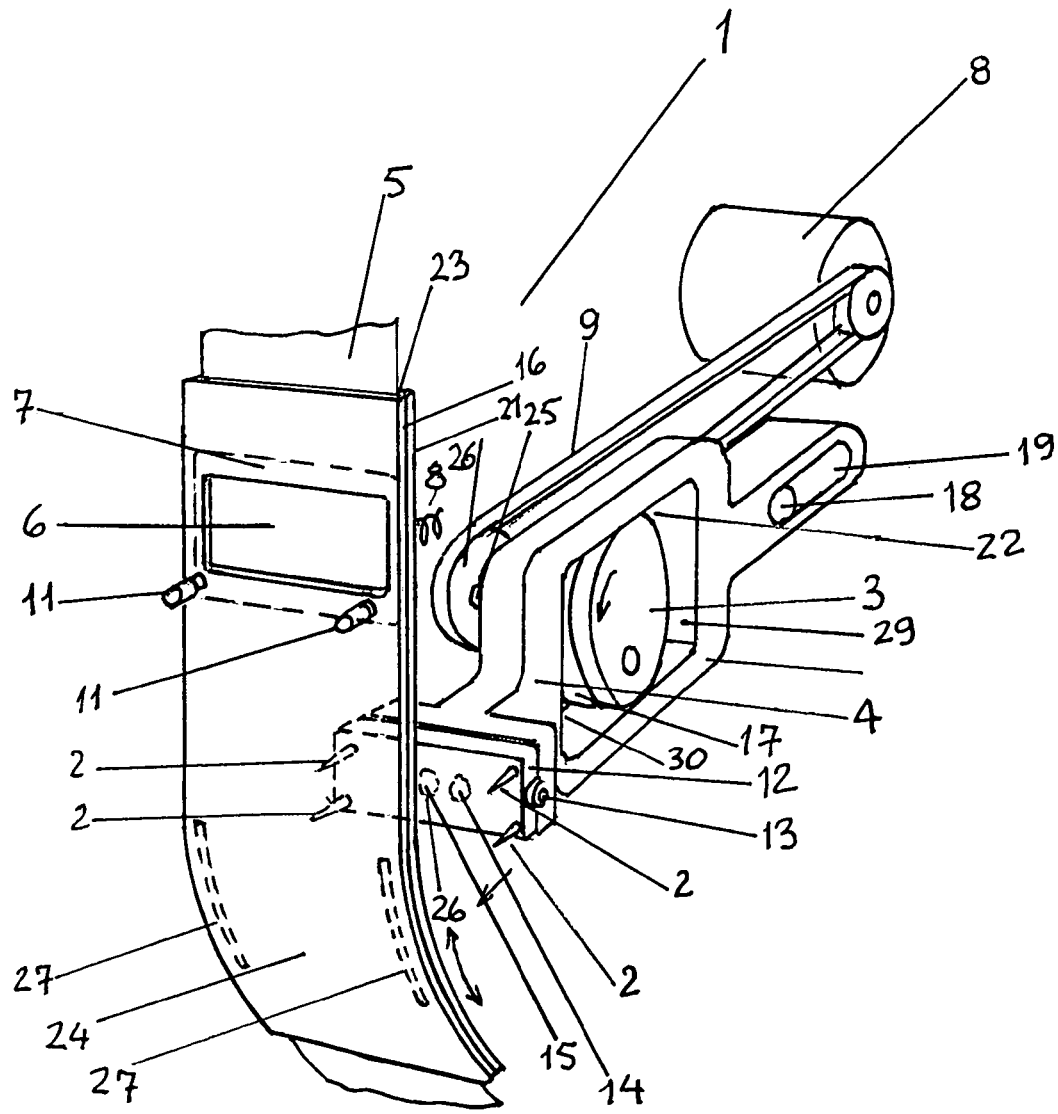
FIG. 1 shows a perspective view of a device for transporting unperforated motion picture film intermittently.

FIG. 1 shows a perspective view of a device 1 for transporting unperforated film 5 intermittently. Two needles 2 are positioned one above the other on the front left of unit 12 and two needles 2 are positioned one above the other on the front right of unit 12. Unit 12 has a swivel point 13 on each side. Unit 12 is supported in a fixed position by spring-loaded ball 15. The pressure of spring-loaded ball 15 in tight-fitting recess 26 on the back of unit 12, which supports unit 12 is overridden when too much vertical resistance by jammed film 5 occurs to needles 2, if film 5 jams. Unit 12 with needles 2 then swivel upwards or downwards depending on whether film 5 is being transported in a forward or reverse direction. When this occurs, electrical contact 14 is broken, turning off battery-driven electric motor 8 which drives device 1. Spring-loaded ball 15 is positioned behind unit 12 on the forward end of element 4. The rear of element 4 is mounted on axle 18 via slot 19 which allows forward and rear travel of element 4. Element 4 has an opening 22. Round eccenter 3 is mounted on axle 25 and is located with very little play between its circumference and the inside of opening 22 within opening 22 of element 4. The rotation of round eccenter 3 determines vertical travel of element 4. Axle 25 is attached to pulley 26 which is connected to electric motor 8 via belt 9. Horizontal movement of element 4 is controlled by the rotating position of eccenter 17, also mounted within opening 22, next to eccenter 3, also on axle 25. As axle 25 is turned by electric motor 8, element 4 with four needles 2 attached to the front of unit 12 is made to move forward so that four needles 2 enter a short distance into the rear, non-emulsion side of film 5, to the left and right of the picture area, outside the picture area, near the left and right edges of film 5. Film 5 is supported within channel 23 within wall 16 and wall 21 which abut during transport of film 5. Curvature 24 of channel 23 with film 5 within it, beneath aperture 6, corresponds to the arc made by the tips of needles 2 as needles 2 are transported downwards when transporting film 5, so that the points of needles 2 remain properly engaged in film 5, when transporting film 5. Needles 2 make an arc when transporting film 5 because of the geometry of eccenter 3 driving element 4. Needles 2 move forward and enter the back of film 5 through two slots 27 in rear wall 21, to transport film 5 vertically from a start position to an end position. Pressure plate 7 located behind film 5, behind picture aperture 6 holds film 5 steady during exposure of film 5 to light. Pressure plate 7 exerts light constant pressure against the back of film 5 by spring 8. The outside edge area of eccenter 17 acts on vertical side 30 of opening 22 in element 4 and moves element 4 with needles 2 forwards so that needles 2 enter the back of film 5 for a short distance without transfixing film 5. Slot 19 in the back of element 4 around axle 18 allows forward and rearward motion of element 4 with needles 2. Eccenter 3 acts on the bottom horizontal side of opening 22 and moves element 4 with needles 2 downwards, transporting film 5 downwards for a certain distance. Eccenter 3 no longer exerts pressure on the bottom side of opening 22 so that film 5 is no longer transported, but eccenter 17 now exerts pressure on vertical side 29 of opening 22 of element 4 and moves element 4 back so that the points of needles 2 disengage film 5. A rotating shutter (not shown) opens, exposing film 5 to light at aperture 6 and two LEDs 11 each expose a round mark on the emulsion side of film 5, outside the picture area, on the frameline. Eccenter 3 now exerts pressure on top horizontal side of opening 22, moving element 4 with needles 2 upwards to a start position for transporting film 5. Eccenter 3 now no longer exerts pressure on the top horizontal side of opening 22 of element 4 but eccenter 17 acts on vertical side 30 of opening 22 moving element 4 and needles 2 forwards as the shutter closes and the tips of needles 2 enter the back of film 5. Film 5 is now transported downwards again, and continues to be transported intermittently until electric motor 8 is turned off.

I claim:

1. A device for transporting photographic film intermittently for motion pictures, said device being driven by at least one electric motor, and having a shutter for exposing said film to light through an aperture in a film gate when said film is at a standstill position, the improvement comprising means for transporting said motion picture film (5) without perforations from a defined start position to a defined stop position by discreetly piercing at least one surface of said film (5) with at least one mechanical point (2), so that said film (5) may be transported without slippage without the use of perforations, said at least one point (2) being inserted into said film (5) to hold said film (5) in order to transport said film (5) from said start position to said stop position, said at least one point (2) being withdrawn from said film (5) at said stop position before being brought to said start position and engaging said film (5) again to transport said film (5).

2. A device as in claim 1 wherein said at least one point (2) is the point of a needle (2).

3. A device as in claim 2 wherein said at least one needle (2) is mounted on at least one unit (12).

4. A device as in claim 3 wherein said at least one unit (12) allows said at least one needle (2) to disengage said film (5) if said film (5) jams.

5. A device as in claim 1 wherein at least one element (7) acts against said film (5) to hold said film (5) steady during exposure to light.

6. A device as in claim 5 wherein said at least one element (7) is a pressure plate (7).

7. A device as in claim 5 wherein said at least one element (7) is a movable element (7), moving while said film (5) is being transported.

8. A device as in claim 1 wherein at least one mark is exposed on said film (5) to assist in picture registration.

\* \* \* \* \*